(12) United States Patent
Iwakura et al.

(10) Patent No.: US 10,967,845 B2
(45) Date of Patent: Apr. 6, 2021

(54) DRIVE-FORCE TRANSMITTING APPARATUS FOR VEHICLE

(71) Applicant: TOYOTA JIDOSHA KABUSHIKI KAISHA, Toyota (JP)

(72) Inventors: Kazuki Iwakura, Toyota (JP); Hiroaki Kiyokami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/449,877

(22) Filed: Jun. 24, 2019

(65) Prior Publication Data

US 2020/0010072 A1 Jan. 9, 2020

(30) Foreign Application Priority Data

Jul. 6, 2018 (JP) .............................. JP2018-129347

(51) Int. Cl.
*B60W 10/04* (2006.01)
*B60K 6/36* (2007.10)
*B60K 6/50* (2007.10)
*F16H 61/00* (2006.01)

(52) U.S. Cl.
CPC ............... *B60W 10/04* (2013.01); *B60K 6/36* (2013.01); *B60K 6/50* (2013.01); *F16H 61/0025* (2013.01)

(58) Field of Classification Search
CPC ....................................................... B60K 6/50
See application file for complete search history.

(56) References Cited

U.S. PATENT DOCUMENTS

| 6,413,183 | B1* | 7/2002 | Ishikawa | F16H 48/08 |
| | | | | 475/160 |
| 6,553,868 | B2* | 4/2003 | Takenaka | F16H 55/17 |
| | | | | 74/665 B |
| 2010/0005925 | A1 | 1/2010 | Oomura | |
| 2010/0086422 | A1* | 4/2010 | Shinozaki | F04C 14/185 |
| | | | | 418/21 |
| 2011/0099993 | A1* | 5/2011 | Ishii | F16H 47/04 |
| | | | | 60/436 |
| 2011/0252906 | A1* | 10/2011 | Harashima | F16H 57/0483 |
| | | | | 74/325 |

(Continued)

FOREIGN PATENT DOCUMENTS

| CN | 102235352 A | 11/2011 |
| FR | 2956460 A1 | 8/2011 |
| JP | 2011-174583 A | 9/2011 |

*Primary Examiner* — Brian L Swenson
(74) *Attorney, Agent, or Firm* — Oliff PLC

(57) ABSTRACT

A vehicle drive-force transmitting apparatus including: a drive gear; a fluid pump that is to driven by rotation of the drive gear; and a casing that stores therein the drive gear and the fluid pump. The fluid pump includes: a pump body; a pump cover; a rotor; a driven gear that meshes with the drive gear; and a pump shaft on which the rotor and the driven gear are mounted. The pump shaft is rotatably supported at its supported portion by the pump body and/or the pump cover. The driven gear is mounted on a free end portion of the pump shaft. An outer peripheral portion of the pump body or an outer peripheral portion of the pump cover is supported by the casing, such that the other portion of the pump body and the other portion of the pump cover are spaced apart from the casing.

10 Claims, 6 Drawing Sheets

(56) References Cited

U.S. PATENT DOCUMENTS

| | | | |
|---|---|---|---|
| 2012/0076674 A1* | 3/2012 | Nomura | B60K 6/445 417/319 |
| 2012/0217830 A1* | 8/2012 | Iwase | B60K 6/26 310/78 |
| 2019/0128179 A1* | 5/2019 | Kiyokami | B60K 6/26 |
| 2019/0249765 A1* | 8/2019 | Ito | F16H 57/0435 |

* cited by examiner

DRIVE-FORCE TRANSMITTING APPARATUS FOR VEHICLE

This application claims priority from Japanese Patent Application No. 2018-129347 filed on Jul. 6, 2018, the disclosure of which is herein incorporated by reference in its entirety.

FIELD OF THE INVENTION

The present invention relates to a drive-force transmitting apparatus for a vehicle, and is more particularly concerned with a structure for disposing a fluid pump in the drive-force transmitting apparatus.

BACKGROUND OF THE INVENTION

There is known a drive-force transmitting apparatus for a vehicle, wherein the transmitting apparatus includes: a drive gear that serves as a drive-force transmitting member configured to transmit a drive force from the drive force source to the drive wheels; a fluid pump that is to driven by rotation of the drive gear; and a casing that stores therein the drive gear and the fluid pump. JP-2011-174583A discloses such a drive-force transmitting apparatus for a vehicle. In the disclosed drive-force transmitting apparatus, the fluid chamber includes: a pump body that defines therein a pump chamber; a pump cover that covers the pump chamber and is fixed to the pump body; a rotor that is disposed in the pump chamber; a driven gear that meshes with the drive gear; and a pump shaft on which the rotor and the driven gear are mounted.

Further, in the drive-force transmitting apparatus disclosed in the above-identified Japanese Patent Application Publication, the fluid pump is in close contact with the casing so as to be attached to the casing, such that the pump cover is fitted in a recess provided in a wall surface of the casing. Owing to this arrangement, when the fluid pump is assembled into the casing, the rotor is prevented from being removed from the pump chamber whereby an assemblability of the fluid pump is improved.

SUMMARY OF THE INVENTION

By the way, when the fluid pump is driven by the drive gear which serves as the drive-force transmitting member and which meshes with the driven gear mounted on the pump shaft, there is a case in which vibration is generated in the rotor or meshing portions of the respective drive and driven gears, due to a meshing transmission error (e.g., transmission error based on a rotational fluctuation of the drive or driven gear that is not rotated at a constant cycle). In the drive-force transmitting apparatus disclosed in the above-identified Japanese Patent Application Publication in which the entirety of a surface of the pump cover is in contact with the wall surface of the casing that is opposed to the surface of the pump cover, when the fluid pump is driven, the above-described vibration generated in the rotor or the meshing portions is transmitted, for example, through the pump cover, to the entirety of the wall surface of the casing whereby the casing is vibrated. Thus, the vibration is likely to be emitted as noise to outside the casing, so as to be transmitted to outside and/or inside the vehicle.

The present invention was made in view of the background art described above. It is therefore an object of the present invention to provide a drive-force transmitting apparatus for a vehicle, which is capable of damping vibration generated by drive of a fluid pump, so as to reduce noise that is emitted to outside the casing.

The object indicated above is achieved according to the following aspects of the present invention.

According to a first aspect of the invention, there is provided a drive-force transmitting apparatus for a vehicle that includes a drive force source and drive wheels. The drive-force transmitting apparatus includes: a drive gear that serves as a drive-force transmitting member configured to transmit a drive force from the drive force source to the drive wheels; a fluid pump that is to driven by rotation of the drive gear; and a casing that stores therein the drive gear and the fluid pump. The fluid pump includes: a pump body that defines therein a pump chamber; a pump cover that covers the pump chamber and is fixed to the pump body; a rotor that is disposed in the pump chamber; a driven gear that meshes with the drive gear; and a pump shaft on which the rotor and the driven gear are mounted, wherein the pump shaft has a supported portion and a free end portion, such that the pump shaft is rotatably supported at the supported portion by at least one of the pump body and the pump cover, and such that the driven gear is mounted on the free end portion of the pump shaft, wherein the pump body has an outer peripheral portion that is located on an outer side of other portion of the pump body in a radial direction of the rotor, and the pump cover has an outer peripheral portion that is located on an outer side of other portion of the pump cover in the radial direction, and wherein one of the outer peripheral portion of the pump body and the outer peripheral portion of the pump cover is supported by the casing, and the other portion of the pump body and the other portion of the pump cover are spaced apart from the casing. For example, the pump shaft may be a cantilever shaft, and is may be rotatably supported by the pump body and the pump cover, such that the rotor is fitted on an end portion of the pump shaft while the driven gear is fitted on another end portion of the pump shaft. Further, the one of the outer peripheral portion of the pump body and the outer peripheral portion of the pump cover may include a plurality of connected portions that are connected to a plurality of connected portions of an inside wall surface of the casing through respective protrusions that extend between the plurality of connected portions of the above-described one and the plurality of connected portions of the inside wall surface, such that the other portion of the pump body and the other portion of the pump cover are spaced from at least a portion of the inside wall surface of the casing which is located between the plurality of connected portions of the inside wall surface of the casing. Moreover, the plurality of connected portions of the one of the outer peripheral portion of the pump body and the outer peripheral portion of the pump cover may consist of at least three connected portions, while the plurality of connected portions of the inside wall surface of the casing may consist of at least three connected portion, such that the portion of the inside wall surface of the casing, which is spaced apart from the other portion of the pump body and the other portion of the pump cover, is located between the at least three connected portion of the inside wall surface of the casing.

According to a second aspect of the invention, in the drive-force transmitting apparatus according to the first aspect of the invention, the outer peripheral portion of the pump body and the outer peripheral portion of the pump cover are located on an outer side of an outer periphery of the rotor in the radial direction.

According to a third aspect of the invention, in the drive-force transmitting apparatus according to the first or second aspect of the invention, the pump shaft is a stepped shaft having a step, wherein the rotor, which is mounted on the pump shaft, has axially opposite end surfaces that are opposite to each other in an axial direction of the pump shaft, such that one of the axially opposite end surfaces of the rotor, which is closer to the free end portion of the pump shaft than the other of the axially opposite end surfaces, is in contact with the step of the pump shaft.

According to a fourth aspect of the invention, in the drive-force transmitting apparatus according to the third aspect of the invention, the rotor is limited, by the step of the pump shaft, from being displaced relative to the pump shaft in a first direction that is parallel to the axial direction, wherein the driven gear is a helical gear, and wherein, when the driven gear is driven by the drive gear during forward running of the vehicle, a thrust load is applied to the driven gear and acts in a second direction that is opposite to the first direction.

According to a fifth aspect of the invention, in the drive-force transmitting apparatus according to the fourth aspect of the invention, the pump body has a sliding contact surface which is perpendicular to the axial direction and which is in sliding contact with the other of the axially opposite end surfaces of the rotor, wherein at least part of the thrust load is received by the sliding contact surface of the pump body.

According to a sixth aspect of the invention, in the drive-force transmitting apparatus according to the fourth or fifth aspect of the invention, the pump body has a fluid inlet and a fluid discharge passage such that a fluid is introduced through the fluid inlet from outside the pump body and such that the fluid is discharged through the fluid discharge passage to outside the pump body, wherein the second direction is substantially the same as a discharge direction in which the fluid flows to be discharged through the fluid discharge passage.

According to a seventh aspect of the invention, in the drive-force transmitting apparatus according to the sixth aspect of the invention, at least a part of the fluid discharge passage is located on an inner side of an outer periphery of the rotor in the radial direction.

In the drive-force transmitting apparatus according to the first aspect of the invention, the pump shaft has the supported portion and the free end portion, such that the pump shaft is rotatably supported at the supported portion by at least one of the pump body and the pump cover, and such that the driven gear is mounted on the free end portion of the pump shaft, wherein the pump body has the outer peripheral portion that is located on the outer side of the other portion of the pump body in the radial direction of the rotor, and the pump cover has the outer peripheral portion that is located on the outer side of the other portion of the pump cover in the radial direction, and wherein one of the outer peripheral portion of the pump body and the outer peripheral portion of the pump cover is supported by the casing, and the other portion of the pump body and the other portion of the pump cover are spaced apart from the casing. Owing to this arrangement, in the drive-force transmitting apparatus, it is possible to increase a vibration transmission path from a vibration generating source of the fluid pump in the form of the rotor or meshing portions of the drive and driven gears, to the casing. Thus, it is possible to damp vibration generated in the rotor or the meshing portions of the drive and drive gears, and accordingly to reduce noise that is emitted to outside the casing.

In the drive-force transmitting apparatus according to the second aspect of the invention, the outer peripheral portion of the pump body and the outer peripheral portion of the pump cover are located on the outer side of the outer periphery of the rotor in the radial direction. Owing to this arrangement, in the drive-force transmitting apparatus, it is possible to further increase the vibration transmission path from the vibration generating source of the fluid pump to the casing. Thus, it is possible to further damp the vibration generated in the rotor or the meshing portions of the drive and drive gears, and accordingly to further reduce the noise that is emitted to outside the casing.

In the drive-force transmitting apparatus according to the third aspect of the invention, the pump shaft is the stepped shaft having the step, wherein the rotor, which is mounted on the pump shaft, has the axially opposite end surfaces that are opposite to each other in the axial direction of the pump shaft, such that one of the axially opposite end surfaces of the rotor, which is closer to the free end portion of the pump shaft than the other of the axially opposite end surfaces, is in contact with the step of the pump shaft. Owing to this arrangement, movement of the rotor relative to the pump shaft in the axial direction is structurally limited, so that the rotor can be positioned in a desired position relative to the pump shaft in the axial direction, by a simple construction without an additional member such as a positioning member.

In the drive-force transmitting apparatus according to the fourth aspect of the invention, the rotor is limited, by the step of the pump shaft, from being displaced relative to the pump shaft in the first direction that is parallel to the axial direction, wherein the driven gear is the helical gear, and wherein, when the driven gear is driven by the drive gear during forward running of the vehicle, the thrust load is applied to the driven gear and acts in the second direction that is opposite to the first direction. Owing to this arrangement, during the forward running that is made frequently, the thrust load is applied to the driven gear as the helical gear in a direction in which the pump shaft is introduced into the rotor, so that it is possible to reduce frequency of occurrence of a load forcing the pump shaft to be removed from the rotor. Therefore, for fitting the pump shaft in the rotor or fitting the rotor on the pump shaft, an additional element such as a ball bearing and a bushing and an additional support structure for the easing are not required, whereby the fitting of the rotor and the pump shaft can be made by a simple construction.

In the drive-force transmitting apparatus according to the fifth aspect of the invention, the pump body has the sliding contact surface which is perpendicular to the axial direction and which is in sliding contact with the other of the axially opposite end surfaces of the rotor, wherein the thrust load or a part of the thrust load is received by the sliding contact surface of the pump body. Owing to this arrangement, it is possible to cause the sliding contact surface to cooperate or share with the pump shaft to receive the thrust load applied from the driven gear, thereby making it possible to increase durability of the pump shaft.

In the drive-force transmitting apparatus according to the sixth aspect of the invention, the pump body has the fluid inlet and the fluid discharge passage such that the fluid is introduced through the fluid inlet from outside the pump body and such that the fluid is discharged through the fluid discharge passage to outside the pump body, wherein the second direction is substantially the same as the discharge direction in which the fluid flows to be discharged through the fluid discharge passage. Owing to this arrangement, the second direction, i.e., the direction in which the thrust load is applied from the driven gear to the rotor, is opposite to a direction of a discharge reaction force of the fluid discharged through the fluid discharge passage, so that the thrust load applied from the driven gear to the rotor and the discharge reaction force applied from the fluid to the rotor can be offset by each other. Therefore, it is possible to reduce a surface pressure acting on the rotor thereby leading to an improvement of durability of the rotor.

In the drive-force transmitting apparatus according to the seventh aspect of the invention, at least a part of the fluid discharge passage is located on an inner side of an outer periphery of the rotor in the radial direction. Owing to this arrangement, the thrust load applied from the driven gear to the rotor and the discharge reaction force applied from the fluid to the rotor can be more reliably offset by each other, thereby making it possible to more reliably reduce the surface pressure acting on the rotor and to more reliably improve the durability of the rotor.

DETAILED DESCRIPTION OF PREFERRED EMBODIMENT

The present invention is applicable to a drive-force transmitting apparatus for any type of vehicle such as a vehicle which is to be driven by an internal combustion engine as a drive force source, a hybrid vehicle which has not only the engine but also an electric motor as another drive force source and which is to be driven by the engine and the electric motor, and an electric motor which has only an electric motor as a drive force source and which is to be driven by the electric motor. For example, the drive-force transmitting apparatus may be a transaxle that is to be installed in a FR (front engine-rear drive) vehicle or a four-wheel drive vehicle, or may be a transaxle of lateral installation type that is to be installed in a FF (front engine-front drive) vehicle such that a plurality of axes are arranged in parallel to a lateral (transverse) direction of the vehicle.

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
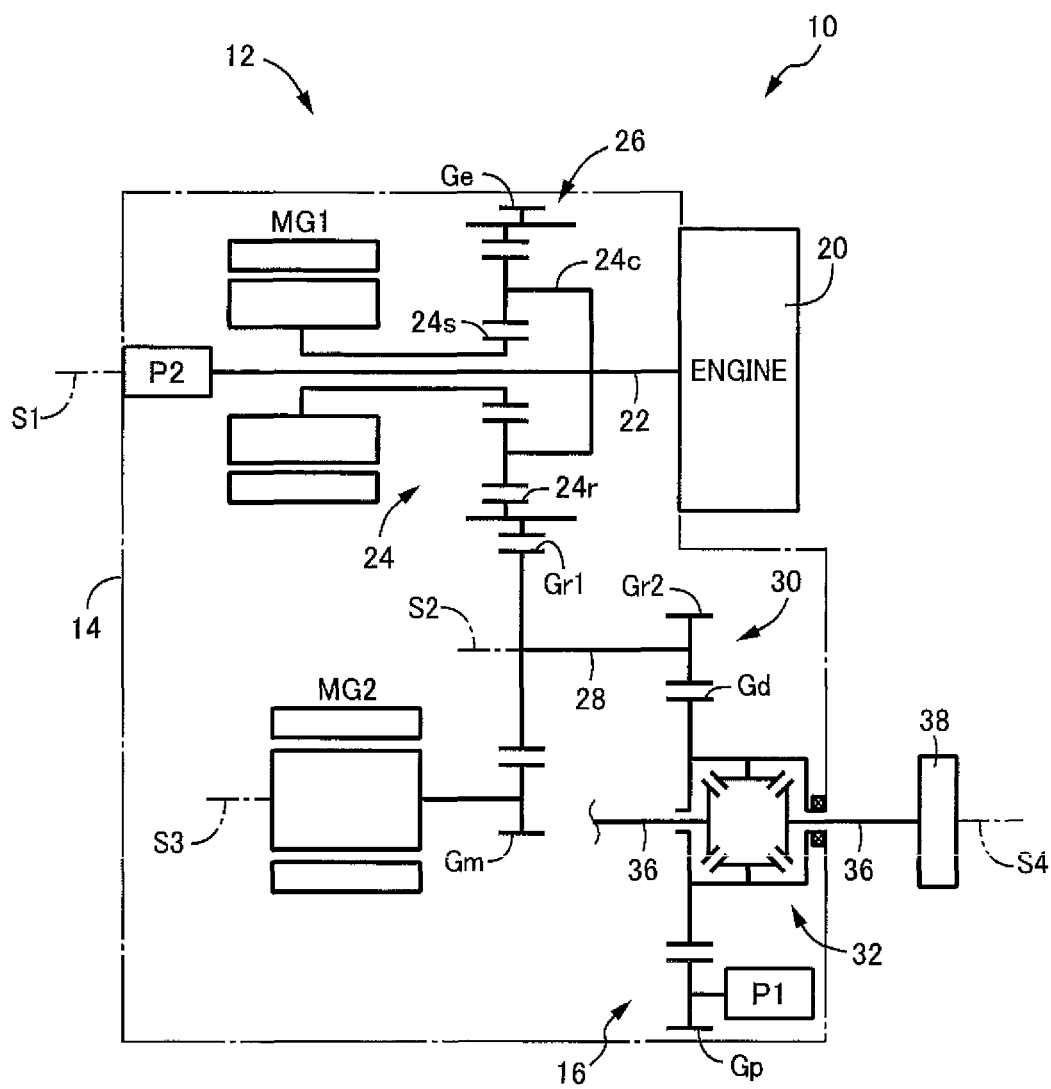
FIG. 1 is a schematic view showing a drive-force transmitting apparatus for a vehicle, to which the present invention is applied.

FIG. 1 is a schematic view showing a transaxle, i.e., drive-force transmitting apparatus 12 for a vehicle 10, to which the present invention is applied. The view of FIG. 1 is a development view illustrating the drive-force transmitting apparatus 12 in a manner in which a plurality of axes of a drive-force transmitting mechanism 16 of the drive-force transmitting apparatus 12 are contained in a single plane. The drive-force transmitting apparatus 12 is configured to transmit an output of the engine 20 to right and left drive wheels 38. The drive-force transmitting apparatus 12 is of a lateral installation type that is to be installed in a FF vehicle, for example, and a plurality of axes of the drive-force transmitting mechanism 16, which is disposed in the casing 14, are arranged in parallel to a lateral direction of the vehicle 10. The engine 20 is an internal combustion engine such as a gasoline engine or a diesel engine, which is configured to generate a drive force by combustion of a fuel. The casing 14 may be constituted by a single member or a plurality of members that are fixed to each other.

The drive-force transmitting mechanism 16 has first through fourth axes S1-S4 that substantially parallel to the lateral direction of the vehicle 10. An input shaft 22 is disposed on the first axis S1, and is connected to the engine 20 serving as a drive force source for driving the vehicle 10. A planetary gear device 24 of a single-pinion type and a first motor generator MG1 are disposed to be coaxial with the first axis S1. The planetary gear device 24 and the first motor generator MG1 cooperate with each other to constitute an electrically-controlled differential portion 26. The planetary gear device 24, which constitutes a differential mechanism, has a first rotary element in the form of a carrier 24c that is connected to the input shaft 22, a second rotary element in the form of a sun gear 24s connected to the first motor generator MG1 and a third rotary element in the form of a ring gear 24r provided integrally with an engine output gear Ge. The first motor generator MG1, which constitutes a differential-control rotating machine, is to be operated selectively as an electric motor and a generator. For example, in a regenerative control in which the first motor generator MG1 is operated as the generator, a rotational speed of the sun gear 24s is controlled in a continuously changing manner, whereby a rotational speed transmitted from the engine 20 is continuously changed and is outputted through the engine output gear Ge. Further, when a torque of the first motor generator MG1 is controlled to zero, the sun gear 24s is idled or freely rotated whereby transmission of the drive force between the engine 20 and the drive-force transmitting mechanism 16 is interrupted so that dragging of the engine 20 is prevented.

A large reduction gear Gr1 and a small reduction gear Gr2, which cooperate with each other to constitute a reduction gear device 30, are mounted on respective axially opposite end portions of an intermediate shaft 28 that is disposed on the second axis S2. The large reduction gear Gr1 meshes with the above-described engine output gear Ge, and also with a motor output gear Gm of a second motor generator MG2 which is disposed on the third axis S3. The second motor generator MG2, which constitutes a vehicle-driving rotating machine, is to be operated selectively as an electric motor and a generator. For example, in a power running control in which the second motor generator MG2 is operated as the electric motor, the second motor generator MG2 serves as another drive force source for driving the vehicle 10.

The small reduction gear Gr2 meshes with a differential ring gear Gd of a differential device 32 that is disposed on the fourth axis S4, so that the drive force transmitted from the engine 20 and/or the second motor generator MG2 is distributed to right and left drive axles 36 through the differential device 32 and is then transmitted to the right and left drive wheels 38. The differential ring gear Gd corresponds to "drive gear" recited in the appended claims. The differential device 32 constitutes an output portion, and the differential ring gear Gd constitutes an input gear. The engine output gear Ge, large reduction gear Gr1, small reduction gear Gr2 and differential ring gear Gd cooperate with one another to constitute at least a part of a gear mechanism.

In the drive-force transmitting apparatus 12 for the vehicle 10 according to the present invention, there are a first oil pump P1 and a second oil pump P2 as lubrication fluid sources of a lubricating device (not shown). The first and second oil pumps P1, P2 are connected to respective fluid supply passages that are independent from each other, so as to lubricate respective assigned parts of the drive-force transmitting mechanism 16. As shown in FIG. 1, the first oil pump P1 is a mechanical pump that is to be mechanically driven through a driven gear Gp (described below) that meshes with a differential ring gear Gd (described below), while the second oil pump P2 is a mechanical pump that is connected to the input shaft 22 so as to be mechanically driven through the engine 20. The first and second oil pumps P1, P2 are both disposed within the casing 14. It is noted that the first oil pump P1 may be modified such that the first oil pump P1 is to be driven by adapting the driven gear Gp to mesh with the large reduction gear Gr1 or small reduction gear Gr2 that are rotatable with the differential ring gear Gd.

Figure 2:
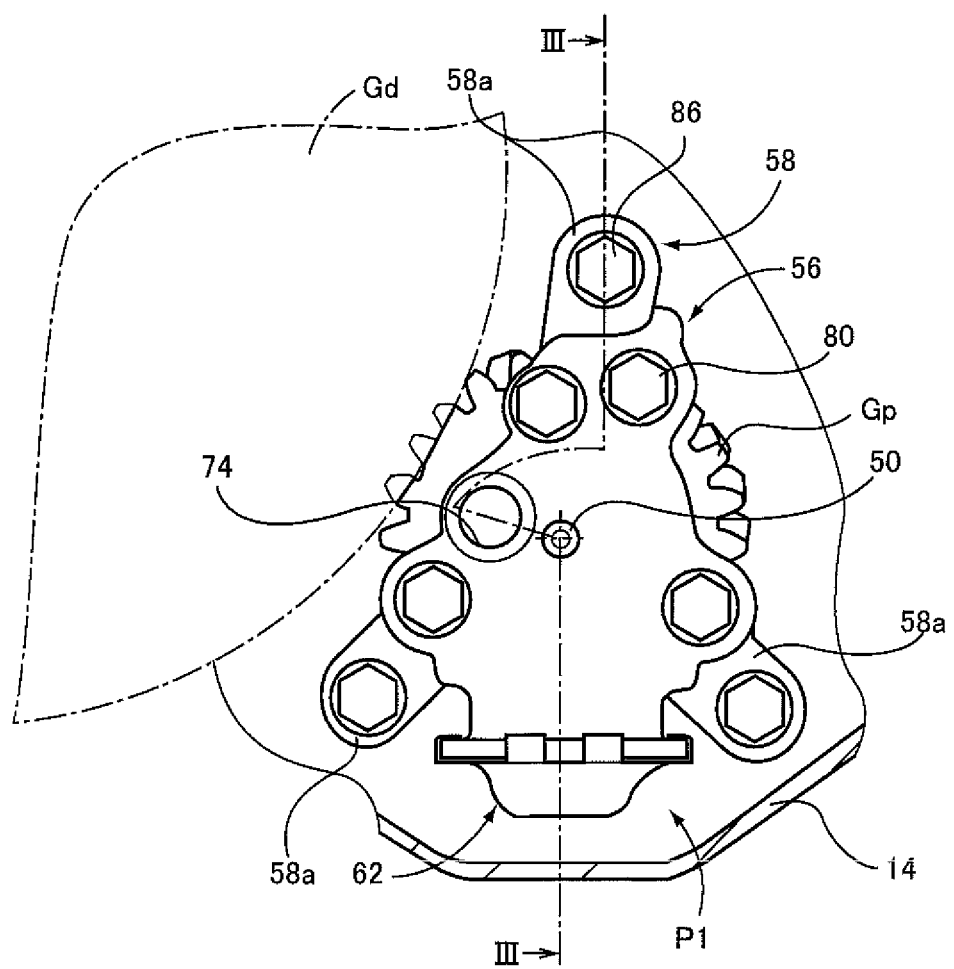
FIG. 2 is view showing, in enlargement, a part of the drive-force transmitting apparatus shown in FIG. 1.
Figure 3:
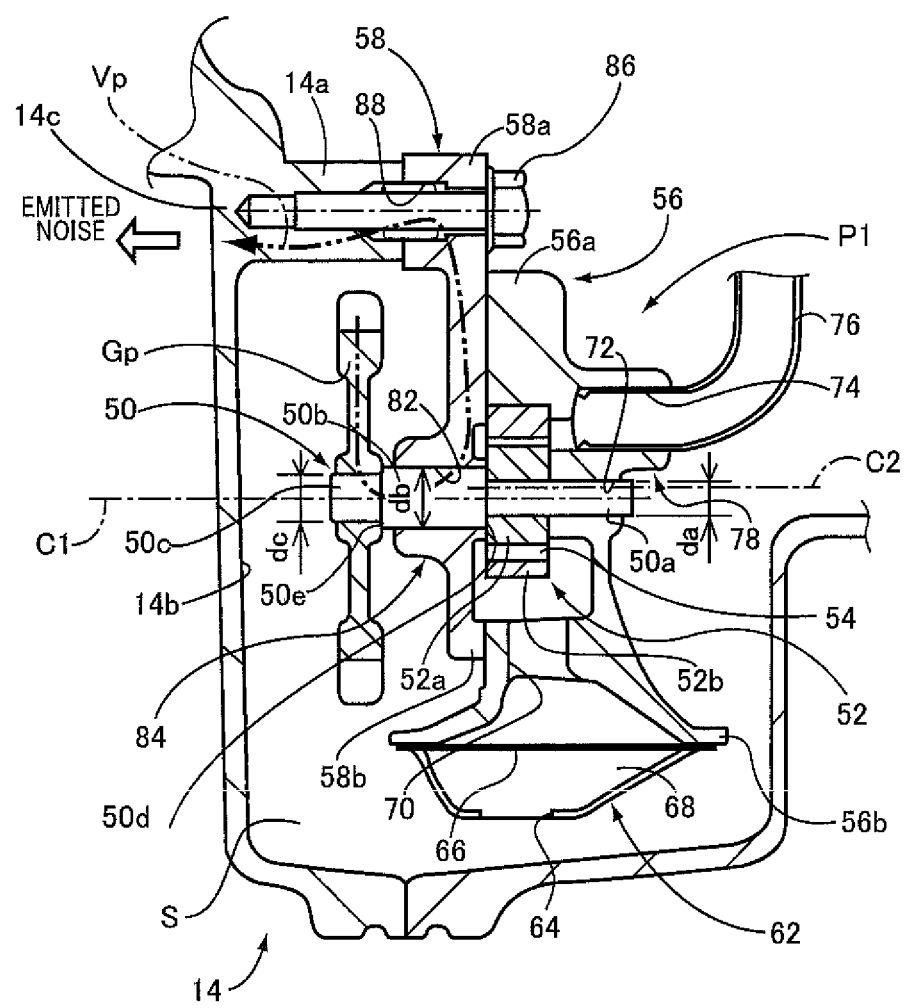
FIG. 3 is a cross sectional view taken in line III-III indicated in FIG. 2 and showing a structure for disposing a fluid pump in the drive-force transmitting apparatus shown in FIG. 1.
Figure 4:
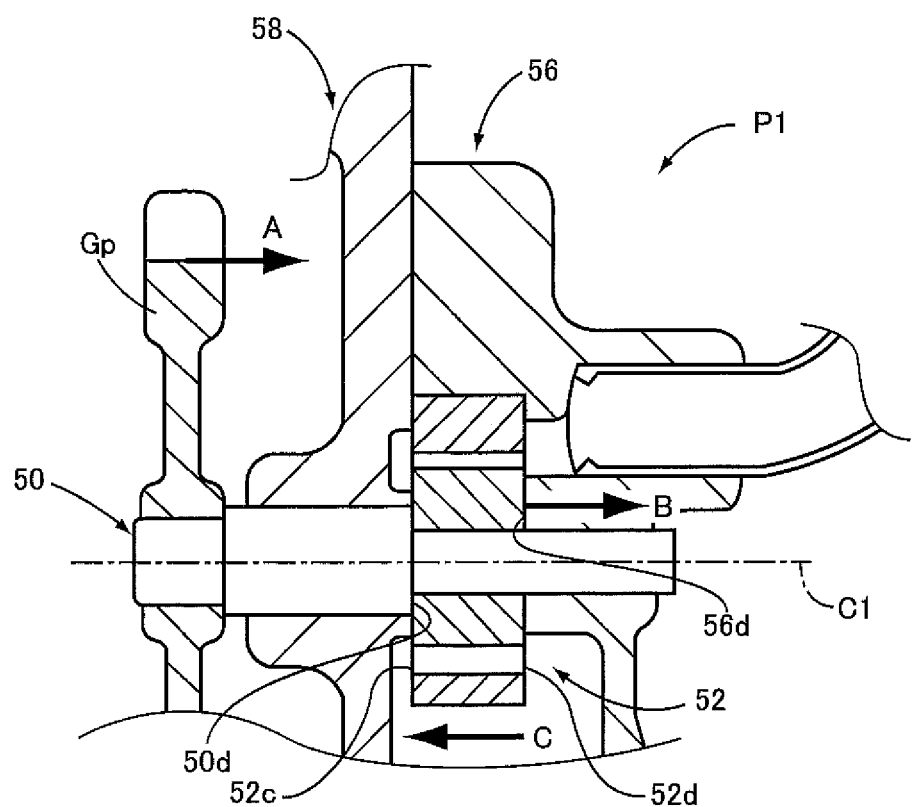
FIG. 4 is a view showing, in enlargement, a part of the oil pump shown in FIG. 3.
Figure 5:
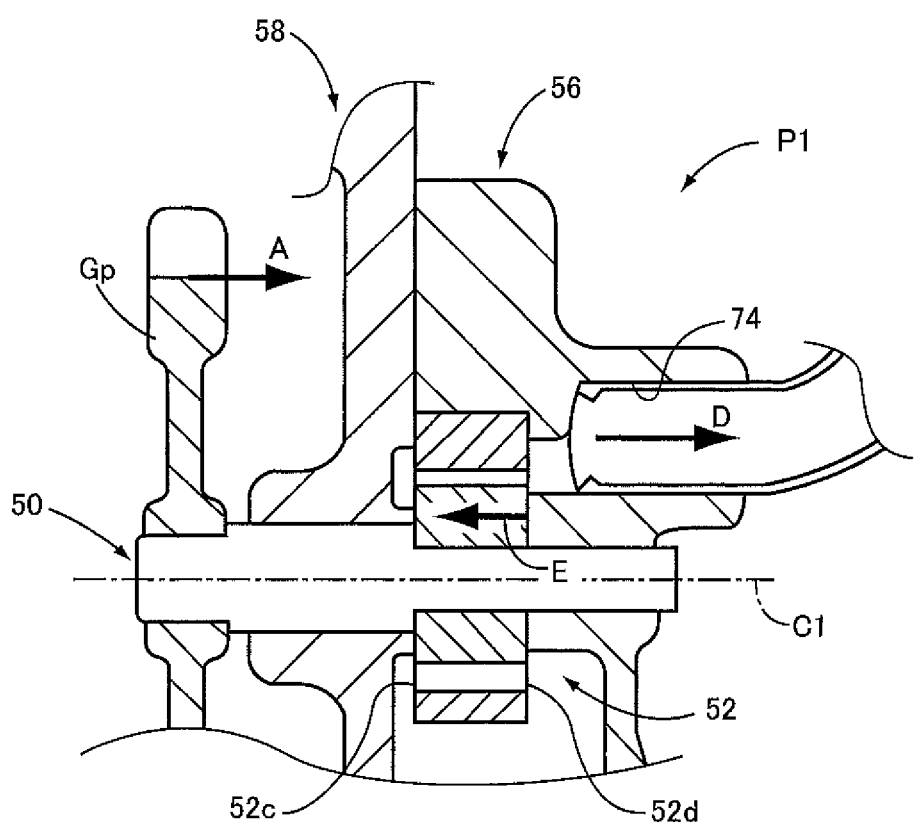
FIG. 5 is a view showing, in enlargement, the part of the oil pump shown in FIG. 3.

FIG. 2 is view showing, in enlargement, a part of the drive-force transmitting apparatus 12 shown in FIG. 1. Specifically, FIG. 2 shows a construction of a main portion of the first oil pump P1 and a surrounding of the main portion, namely, a positional relationship between the differential ring gear Gd and the driven gear Gp that mesh with each other, wherein the differential ring gear Gd serves as a drive-force transmitting member of the drive-force transmitting mechanism 16 and also as a drive gear for driving the first oil pump P1, while the driven gear Gp is an element included in the first oil pump P1. FIG. 3 is a cross sectional view taken in line III-III indicated in FIG. 2. An upward direction in FIG. 3 corresponds to an upward direction of the vehicle 10, and a downward direction in FIG. 3 corresponds to a downward direction of the vehicle 10. Each of FIGS. 4 and 5 is a view showing, in enlargement, a part of the first oil pump P1 shown in FIG. 3. The driven gear Gp of the first oil pump P1 meshes with the differential ring gear Gd provided in the drive-force transmitting mechanism 16, so that the first oil pump P1 is operated or driven with running of the vehicle 10.

The first oil pump P1 includes, in addition to the driven gear Gp meshing with the differential ring gear Gd, a pump shaft 50 on which the driven gear Gp is mounted, a rotor 52 mounted on the pump shaft 50, a pump body 56 defining therein a pump chamber 54, and a pump cover 58 that is fixed to the pump body 56 so as to cover the pump chamber 54. The rotor 52 is disposed in the pump chamber 54.

The pump shaft 50 extends in a direction of an axis C1 that corresponds to a horizontal direction of FIG. 3 and penetrates through the pump body 56 and the pump cover 58. The pump shaft 50 is a cantilever shaft having a free end portion and a supported portion, such that the pump shaft 50 is supported at the supported portion through plain or sliding bearings by the pump body 56 and the pump cover 58, so as to be rotatable about the axis C1. The pump shaft 50 is a stepped shaft that is sectioned into a plurality of cylindrical portions which are arranged in the direction of the axis C1 and which have respective diameters that are different from each other, such that steps are present between the plurality of cylindrical portions. In the present embodiment, the pump shaft 50 is sectioned into three cylindrical portions having respective different diameters and coaxial with each other. Specifically, the three cylindrical portions consist of a first cylindrical portion 50a having a diameter da, a second cylindrical portion 50b contiguous to the first cylindrical portion 50a and having a dimeter db larger than the diameter da, and a third cylindrical portion 50c contiguous to the second cylindrical portion 50b and having a diameter dc smaller than the diameter db. The first cylindrical portion 50a is located on a side of an axial end of the pump shaft 50, while the third cylindrical portion 50c is located on a side of another axial end of the pump shaft 50. The second cylindrical portion 50b is located between the first and third cylindrical portions 50a, 50c in the direction of the axis C1. The rotor 52 is fitted on the first cylindrical portion 50a so as to be unrotatable relative to the pump shaft 50. Each of the first and second cylindrical portions 50a, 50b constitutes the above-described supported portion at which the pump shaft 50 is supported by the pump body 56 and the pump cover 58. The third cylindrical portion 50c constitutes the above-described free end portion on which the driven gear Gp is fitted on so as to be unrotatable relative to the pump shaft 50. A first step 50d is defined between the first and second cylindrical portions 50a, 50b, and a second step 50e is defined between the second and third cylindrical portions 50b, 50c.

The rotor 52, which is fitted on the first cylindrical portion 50a unrotatably relative to the pump shaft 50, is an internal gear pump including an inner rotor 52a rotatable together with the pump shaft 50 about the axis C1 and an outer rotor 52b meshing with the inner rotor 52a and rotatable about an axis C2 that is offset from the axis C1. Each of the inner and outer rotors 52a, 52b is formed, for example, by a mold through sintering. The outer rotor 52b is disposed inside the pump chamber 54 defined in the pump body 56. The rotor 52, which is fitted on the pump shaft 50, has axially opposite end surfaces, and one 52c of the axially opposite end surfaces 52c, 52d, which is located closer to the above-described other axial end of the pump shaft 50 (namely, which is located closer to the above-described freed end portion of the pump shaft 50), is in contact with the first step 50d, so that the rotor 52 is limited, by the first step 50d, from being displaced relative to the pump shaft 50 in a leftward direction (as seen in FIG. 3) that is parallel to the direction of the axis C1. Thus, the rotor 52 can be positioned in a predetermined position relative to the pump shaft 50 in the direction of the axis C1. With the driven gear Gp being rotated by rotation of the differential ring gear Gd, a hydraulic pressure is generated by rotation of the rotor 52 together with the pump shaft 50 in the first oil pump P1.

The pump body 56 is provided by a member that is elongated in a vertical direction, i.e., a height direction of the vehicle 10, and has a fluid strainer 62 located in its lower end portion. A fluid inlet 64 is provided to open in a lower end of the fluid strainer 62. A lubricant fluid (oil), which is stored in a bottom portion of the casing 14, is sucked up by rotation of the rotor 52 and introduced into the fluid strainer 62 through the fluid inlet 64. On an upper side of the fluid inlet 64, a filter plate 66 is provided to filter the sucked lubricant fluid so as to remove foreign objects that are contained in the lubricant fluid. By the filter plate 66, a filter chamber 68, which is provided by a space located on the upper side of the fluid inlet 64, is sectioned into two portions, i.e., upper and lower portions of the filter chamber 68. In the present embodiment, the fluid strainer 62 is constituted by a member fixed to the pump body 56 and made from a plate that is formed to the fluid strainer 62 by, for example, a pressing operation. As shown in FIG. 3, the fluid strainer 62 is fixed to an outer peripheral portion 56b of the pump body 56, which is provided by a lower end portion of the pump body 56, by suitable means such as caulking.

The pump chamber 54, which is defined in the pump body 56, is located on an upper side of the filter chamber 68, and is in communication with the filter chamber 68 through a fluid passage 70. The pump chamber 54, which is in communication with the fluid passage 70, is defined by a hole having an opening that opens in a side surface of the pump body 56, which is opposed to the pump cover 58, such that the rotor 52 can be introduced in the pump chamber 54 through the opening in a process of manufacturing the first oil pump P1. The rotor 52, which is disposed in the pump chamber 54, is in sliding contact at another one 52d of the above-described axially opposite end surfaces 52c, 52d with a bottom surface of the pump chamber 54 that corresponds to a sliding contact surface 56d of the pump body 56, which is perpendicular to the axis C1. A through-hole 72 is provided to penetrate through a bottom wall of the above-described hole so as to extend in the direction of the axis C1 and open in the sliding contact surface 56d of the pump chamber 54. The through-hole 72 receives therein the first cylindrical portion 50a of the pump shaft 50. The pump body 56 has a pump-shaft supporting portion 78 that defines the through-hole 72. The pump-shaft supporting portion 78 serves as a sliding bearing by which the pump shaft 50 is rotatably supported. It is noted that a sliding bearing member as an additional element may be provided to be fitted in the through-hole 72 so that the pump shaft 50 is rotatably supported by the pump-shaft supporting portion 78 through the sliding bearing member.

The pump body 56 defines a fluid discharge passage 74 that is located on an upper side of the through-hole 72, such that the lubricant fluid discharged from the pump chamber 54 is guided by the fluid discharge passage 74 toward outside the pump body 56, i.e., outside the first oil pump P1. The fluid discharge passage 74, which is in communication with the pump chamber 54, has a tubular shape having an axis extending substantially in parallel to the axis C1 so that the lubricant fluid sucked through the fluid inlet 64 is discharged to flow in a direction substantially parallel to the axis C1. A fluid pipe 76 is fitted in the fluid discharge passage 74 so as to guide the discharged lubricant fluid toward desired parts of the drive-force transmitting mechanism 16 such as gears and bearings, which are required to be lubricated. The fluid discharge passage 74 is positioned relative to the rotor 52 such that at least portion of the fluid discharge passage 74 is located on an inner side of an outer periphery of the rotor 52 in a radial direction of the rotor 52, as shown in FIG. 3.

The pump cover 58 is fixed to the pump body 56 through fasteners in the form of fastening bolts 80 that are shown in FIG. 2. The pump cover 58 is provided by a member that is elongated in the vertical direction of the vehicle 10, and is fixed to the pump body 56, such that the pump chamber 54 defined in the pump body 56 is covered by the pump cover 58. The pump cover 58 has a through-hole 82 extending in the direction of the axis C1, and the pump shaft 50 passes through the through-hole 82. The through-hole 82 receives therein the second cylindrical portion 50b of the pump shaft 50. The pump cover 58 has a pump-shaft supporting portion 84 that defines the through-hole 82. The pump-shaft supporting portion 84 serves as a sliding bearing by which the pump shaft 50 is rotatably supported. Thus, the pump shaft 50 is rotatably supported at its supported portion by the pump-shaft supporting portions 78, 84 of the respective pump body 56 and pump cover 58. It is noted that a sliding bearing member as an additional element may be provided to be fitted in the through-hole 82 so that the pump shaft 50 is rotatably supported by the pump-shaft supporting portion 84 through the sliding bearing member.

As shown in FIGS. 2 and 3, the pump cover 58 includes a plurality of protruding portions 58a that protrude outwardly in the radial direction of the rotor 52. In the present embodiment, the plurality of protruding portions 58a consist of three protruding portions 58a that are substantially equi-angularly spaced apart from one another in a circumferential direction of the rotor 52, as shown in FIG. 2. The three protruding portions 58a cooperate with one another to constitute "outer peripheral portion (of the pump cover)" recited in the appended claims, and correspond to "connected portions (that are included in the outer peripheral portion of the pump cover)" recited in the appended claims. The pump cover 58 further includes three non-protruding portions 58b each of which is located between a corresponding adjacent two of the three protruding portions 58a in the circumferential direction. A radial distance of each of the three protruding portions 58a from the axis C1 is larger than a radial distance of each of the non-protruding portions 58b from the axis C1, as shown in FIG. 3 that shows one of the three protruding portions 58a that is located on an upper side of the axis C1 and one of the non-protruding portions 58b that is located on a lower side of the axis C1. Further, as shown in FIG. 3, each of the protruding portions 58a of the pump cover 58 is located on an outer side of an outer peripheral portion 56a of the pump body 56 in the radial direction of the rotor 52. Each of the protruding portions 58a of the pump cover 58, which radially outwardly protrude from the pump body 56, has a bolt receiving hole 88 in which a fastening bolt 86 is received. The pump cover 58 is fixed to three fastening portions 14a of the casing 14 through the fastening bolts 86 which pass through the respective bolt receiving holes 88 and are screwed into tapped holes provided in the fastening portions 14a. Each of the fastening portions 14a of the casing 14 is constituted by a rib that protrudes from a corresponding one of three connected portions 14c of an inside wall surface 14b of the casing 14 toward inside the casing 14 by a given distance. Each of the fastening portions 14a extends in a direction substantially parallel to the direction of the axis C1, from a corresponding one of the three connected portions 14c of the inside wall surface 14b, which are substantially equi-angularly spaced apart from one another in the circumferential direction of the rotor 52. Each of the pump body 56 and the pump cover 58 is, for example, a die-cast member made of aluminum alloy. It is noted that the fastening portions 14a correspond to "protrusions" recited in the appended claims.

The driven gear Gp is fitted on the free end portion, i.e., the third cylindrical portion 50c of the pump shaft 50, for example, by press-fitting, so as to be unrotatable relative to the pump shaft 50, so that the driven gear Gp is rotatable together with the pump shaft 50 about the axis C1. As shown in FIG. 3, the driven gear Gp is located in a space S that is defined between the inside wall surface 14b of the casing 14 and the pump cover 58. That is, the pump cover 58 is fastened to the fastening portions 14a that is constituted by the ribs that protrude from the respective connected portions 14c of the inside wall surface 14b of the casing 14 by the given distance, so that the pump cover 58 is distant from the inside wall surface 14b of the casing 14, and the driven gear Gp is disposed in the space S that is defined between the pump cover 58 and the inside wall surface 14b of the casing 14.

As shown in FIGS. 4 and 5, when the first oil pump P1 is operated or driven with the driven gear Gp being driven by the differential ring gear Gd that meshes with the driven gear Gp, during forward running of the vehicle 10, a thrust load Fs, which is based on a meshing load generated between the differential ring gear Gd and the driven gear Gp which mesh with each other and which are helical gears, is applied to the driven gear Gp and acts in a direction of arrow A, as shown in FIGS. 4 and 5. In FIG. 4, arrow B indicates a direction of a load Fsd that the sliding contact surface 56d of the pump body 56 receives, wherein the load Fsd corresponds to the thrust load Fs or a part of the thrust load Fs, which is applied to the sliding contact surface 56d through the pump shaft 50 and the rotor 52, and arrow C indicates a direction in which the rotor 52 is mounted onto the pump shaft 50 so as to be fitted on the pump shaft 50. The rotor 52 is limited, by the first step 50d of the pump shaft 50, from being displaced relative to the pump shaft 50, in the direction indicated by the arrow C. As shown in FIG. 4, the first oil pump P1 is constructed such that, during forward running of the vehicle 10, the thrust load Fs, which is applied to or received by the driven gear Gp, acts in the direction of the arrow A that is opposite to the direction of the arrow C in which the rotor 52 is limited from being displaced relative to the pump shaft 50. That is, during the forward running that is more frequent than a reverse running of the vehicle 10, the thrust load Fs is applied to the driven gear Gp as the helical gear in the direction of the arrow A, i.e., a direction in which the pump shaft 50 is introduced into the rotor 52, so that it is possible to reduce frequency of occurrence of a load forcing the pump shaft 50 to be removed from the rotor 52.

In FIG. 5, arrow D indicates a discharge direction in which the lubricant fluid flows to be discharged to outside the pump body 56 while being guided by the fluid discharge passage 74, and arrow E indicates a direction of a discharge pressure, i.e., a discharge reaction force Fr that is generated when the lubricant fluid sucked through the fluid inlet 64 is discharged through the fluid discharge passage 74 by operation of the first oil pump P1. That is, when the lubricant fluid is discharged to outside the first oil pump P1 by operation of the first oil pump P1, the discharge reaction force Fr is applied to the rotor 52 through the pump body 56. Thus, the thrust load Fs and the discharge reaction force Fr act on the rotor 52 in respective opposite directions that offset each other, so that it is possible to reduce a pressure acting on each of the axially opposite end surfaces 52c, 52d of the rotor 52, for example.

Referring back to FIG. 3, two-dot chain line Vp indicates a vibration transmission path that is a path of transmission of vibration generated by meshing of the differential ring gear Gd and the driven gear Gp. In meshing portions of the differential ring gear Gd and the driven gear Gp, a so-called meshing transmission error, i.e., a transmission error based on a rotational fluctuation of the gears that are not rotated at a constant cycle, is generated, and the generation of the meshing transmission error causes vibration. Further, there is also a case in which the vibration is caused by driving of the rotor 52. That is, when the first oil pump P1 is driven, the vibration is generated by a vibration generating source such as the rotor 52 and the meshing portions of the differential ring gear Gd and the driven gear Gp. The vibration generated in the meshing portions of the gears Gd, Gp is transmitted to the inside wall surface 14b of the casing 14, for example, via the driven gear Gp, the pump shaft 50 and the pump cover 58. The vibration generated in the rotor 52 is transmitted to the inside wall surface 14b of the casing 14, for example, via the rotor 52, the pump shaft 50 and the pump cover 58. The vibration transmitted to the casing 14 is emitted as noise to outside the casing 14, so as to be transmitted to outside and/or inside the vehicle 10. However, the noise emitted to outside the casing 14 can be reduced by damping the vibration with increase of the vibration transmission path Vp from the vibration generating source to the inside wall surface 14b of the casing 14. In the present embodiment, the vibration transmission path Vp is longer than in an arrangement in which the pump shaft 50 is supported at an end portion by the pump body 56 and the pump cover 58 and is supported at another end portion by the inside wall surface 14b of the casing 14 and an arrangement in which the pump body 56 and the pump cover 58 supporting the pump shaft 50 are in contact with the inside wall surface 14b of the casing 14, so that the vibration is damped whereby the noise emitted to outside the casing 14 is reduced.

Figure 6:
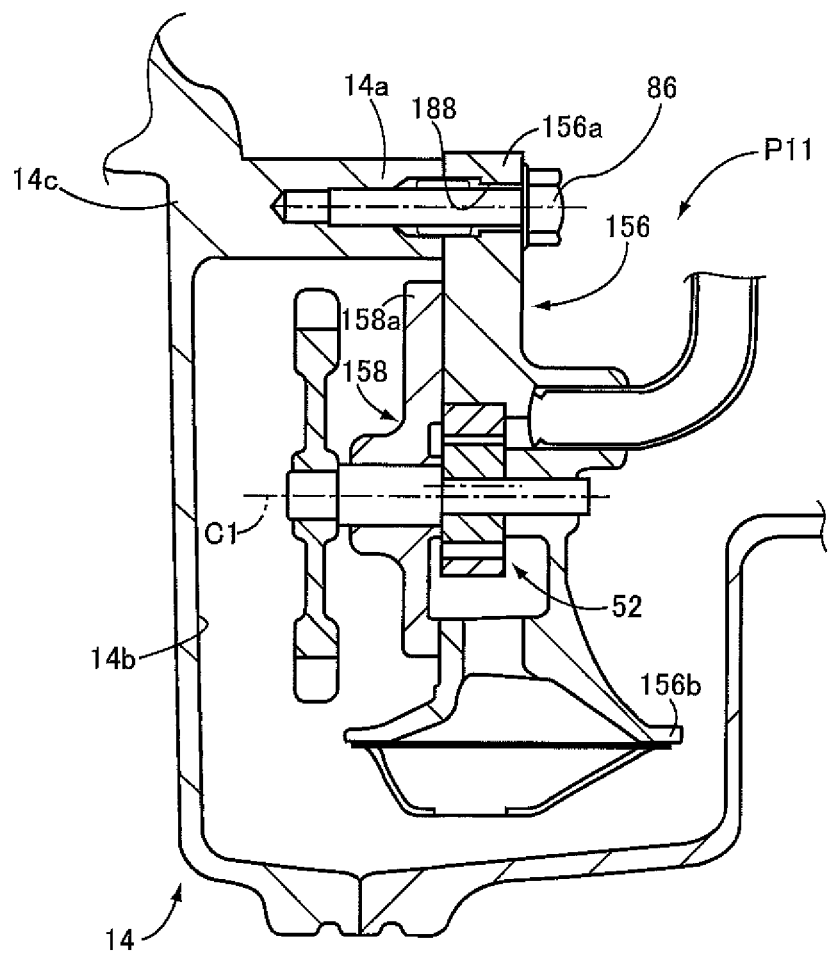
FIG. 6 is a view showing, by way of example, a modification of the drive-force transmitting apparatus to which the present invention is applied, wherein the oil pump is partially modified.

FIG. 6 is a view showing, by way of example, a modification of the drive-force transmitting apparatus 12 to which the present invention is applied, wherein a part of the first oil pump P1 is modified. FIG. 6 is a cross sectional view corresponding to FIG. 3 and showing a structure for disposing a first oil pump P11 (that is a modification of the first oil pump P1) in the drive-force transmitting apparatus 12. As shown in FIG. 6, a pump body 156 is fastened to the fastening portions 14a of the casing 14 by means of the fastening bolts 86.

As shown in FIG. 6, the pump body 156 includes a plurality of protruding portions 156a that protrude outwardly in the radial direction of the rotor 52. Specifically, the plurality of protruding portions 156a consist of three protruding portions 156a that are substantially equi-angularly spaced apart from one another in a circumferential direction of the rotor 52, like the plurality of protruding portions 58a of the pump cover 58 of the first pump P1 in the above-described embodiment (see FIG. 2). The three protruding portions 156a cooperate with one another to constitute "outer peripheral portion (of the pump body)" recited in the appended claims, and correspond to "connected portions (that are included in the outer peripheral portion of the pump body)" recited in the appended claims. The pump body 156 further includes three non-protruding portions 156b each of which is located between a corresponding adjacent two of the three protruding portions 156a in the circumferential direction. A radial distance of each of the three protruding portions 156a from the axis C1 is larger than a radial distance of each of the non-protruding portions 156b from the axis C1, as shown in FIG. 6 that shows one of the three protruding portions 156a that is located on an upper side of the axis C1 and one of the non-protruding portions 156b that is located on a lower side of the axis C1. Further, as shown in FIG. 6, each of the protruding portions 156a of the pump body 156 is located on an outer side of an outer peripheral portion 158a of a pump cover 158 in the radial direction of the rotor 52. Each of the protruding portions 156a of the pump body 156, which radially outwardly protrude from the pump cover 158, has a bolt receiving hole 188 in which the fastening bolt 86 is received. The pump body 156 is fixed at the three protruding portions 156a to the fastening portions 14a of the casing 14 through the fastening bolts 86 which pass through the respective bolt receiving holes 188 and are screwed into the tapped holes provided in the fastening portions 14a. The modification of the embodiment shown in FIG. 6 provides substantially the same advantages as the above-described embodiment in which the pump cover 58 is fixed at the three protruding portions 58a to the fastening portions 14a of the casing 14 through the fastening bolts 86.

In the drive-force transmitting apparatus 12 according to the present embodiment and the modification, the pump shaft 50 has the supported portion and the free end portion, such that the pump shaft 50 is rotatably supported at the supported portion by at least one of the pump body 56, 156 and the pump cover 58, 158, and such that the driven gear Gp is mounted on the free end portion of the pump shaft 50, wherein the pump body 56, 156 has the outer peripheral portion 56a, 156a that is located on the outer side of the other portion of the pump body 56, 156 in the radial direction of the rotor 52, and the pump cover 58, 158 has the outer peripheral portion 58a, 158a that is located on the outer side of the other portion of the pump cover 58, 158 in the radial direction, and wherein one of the outer peripheral portion 56a, 156a of the pump body 56, 156 and the outer peripheral portion 58a, 158a of the pump cover 58, 158 is supported by the casing 14, and the other portion of the pump body 56, 156 and the other portion of the pump cover 58, 158 are spaced apart from the casing 14. Owing to this arrangement, in the drive-force transmitting apparatus 12, it is possible to increase a vibration transmission path from a vibration generating source of the first oil pump P1, P11 in the form of the rotor 52 or meshing portions of the differential ring gear Gd and the driven gear Gp, to the casing 14. Thus, it is possible to damp vibration generated in the rotor 52 or the meshing portions of the differential ring gear Gd and the driven gear Gp, and accordingly to reduce noise that is emitted to outside the casing 14.

In the drive-force transmitting apparatus 12 according to the present embodiment and the modification, the outer peripheral portion 56a, 156a of the pump body 56, 156 and the outer peripheral portion 58a, 158a of the pump cover 58, 158 are located on the outer side of the outer periphery of the rotor 52 in the radial direction. Owing to this arrangement, in the drive-force transmitting apparatus 12, it is possible to further increase the vibration transmission path from the vibration generating source of the first oil pump P1, P11 to the casing 14. Thus, it is possible to further damp the vibration generated in the rotor 52 or the meshing portions of the differential ring gear Gd and the driven gear Gp, and accordingly to further reduce the noise that is emitted to outside the casing 14.

In the drive-force transmitting apparatus 12 according to the present embodiment and the modification, the pump shaft 50 is the stepped shaft having the first step 50d, wherein the rotor 52, which is mounted on the pump shaft 50, has the axially opposite end surfaces 52c, 52d that are opposite to each other in the axial direction of the pump shaft 50 (i.e., the direction of axis C1), such that one 52c of the axially opposite end surfaces 52c, 52d of the rotor 52, which is closer to the free end portion of the pump shaft 50 than the other 52d of the axially opposite end surfaces 52c, 52d, is in contact with the first step 50d of the pump shaft 50. Owing to this arrangement, movement of the rotor 52 relative to the pump shaft 50 in the axial direction is structurally limited, so that the rotor 52 can be positioned in a predetermined position relative to the pump shaft 50 in the axial direction, by a simple construction without an additional member such as a positioning member.

In the drive-force transmitting apparatus 12 according to the present embodiment and the modification, the rotor 52 is limited, by the first step 50d of the pump shaft 50, from being displaced relative to the pump shaft 50 in the first direction that is parallel to the axial direction, wherein the driven gear Gp is the helical gear, and wherein, when the driven gear Gp is driven by the differential ring gear Gd during forward running of the vehicle 10, the thrust load Fs is applied to the driven gear Gp and acts in the second direction that is opposite to the first direction. Owing to this arrangement, during the forward running that is made frequently, the thrust load Fs is applied to the driven gear Gp as the helical gear in a direction in which the pump shaft 50 is introduced into the rotor 52, so that it is possible to reduce frequency of occurrence of a load forcing the pump shaft 50 to be removed from the rotor 52. Therefore, for fitting the pump shaft 50 into the rotor 52 or fitting the rotor 52 onto the pump shaft 50, an additional element such as a ball bearing and a bushing and an additional support structure for the casing 14 are not required, whereby the fitting of the rotor 52 and the pump shaft 50 can be made by a simplified construction.

In the drive-force transmitting apparatus 12 according to the present embodiment and the modification, the pump body 56, 156 has the sliding contact surface 56d which is perpendicular to the axial direction and which is in sliding contact with the other 52d of the axially opposite end surfaces 52c, 52d of the rotor 52, wherein the thrust load Fs or a part of the thrust load Fs is received by the sliding contact surface 56d of the pump body 56, 156. Owing to this arrangement, it is possible to cause the sliding contact surface 56d to cooperate or share with the pump shaft 50 to receive the thrust load Fs applied from the driven gear Gp, thereby making it possible to increase durability of the pump shaft 50.

In the drive-force transmitting apparatus 12 according to the present embodiment and the modification, the pump body 56, 156 has the fluid inlet 64 and the fluid discharge passage 74 such that the fluid is introduced through the fluid inlet 64 from outside the pump body 56, 156 and such that the fluid is discharged through the fluid discharge passage 74 to outside the pump body 56, 156, wherein the second direction is substantially the same as the discharge direction in which the fluid flows to be discharged through the fluid discharge passage 74. Owing to this arrangement, the second direction, i.e., the direction in which the thrust load Fs is applied from the driven gear Gp to the rotor 52, is opposite to a direction of the discharge reaction force Fr of the fluid discharged through the fluid discharge passage 74, so that the thrust load Fs applied from the driven gear Gp to the rotor 52 and the discharge reaction force Fr applied from the fluid to the rotor 52 can be offset by each other. Therefore, it is possible to reduce a surface pressure acting on the rotor 52 thereby leading to an improvement of durability of the rotor 52.

In the drive-force transmitting apparatus 12 according to the present embodiment and the modification, at least a part of the fluid discharge passage 74 is located on an inner side of the outer periphery of the rotor 52 in the radial direction. Owing to this arrangement, the thrust load Fs applied from the driven gear Gp to the rotor 52 and the discharge reaction force Fr applied from the fluid to the rotor 52 can be more reliably offset by each other, thereby making it possible to more reliably reduce the surface pressure acting on the rotor 52 and to more reliably improve the durability of the rotor 52.

While the preferred embodiment of this invention and the modification have been described in detail by reference to the drawings, it is to be understood that the invention may be otherwise embodied.

For example, in the above-described embodiment and modification, the pump chamber 54 is defined in the pump body 56, 156. However, the pump chamber 54 may be defined in the pump cover 58, 158. Further, in the above-described embodiment and modification, the pump shat 50 is supported by both of the pump body 56, 156 and the pump cover 58, 158. However, the pump shaft 50 does not have to be supported necessarily by both of the pump body 56, 156 and the pump cover 58, 158, but may be supported by only one of the pump body 56, 156 and the pump cover 58, 158. Moreover, in the above-described embodiment and modification, the "protrusions" which are recited in the appended claims are constituted by the fastening portions 14a that are portions of the casing 14. However, in the above-described embodiment, the "protrusions" may be constituted by portions of the pump cover 58. Similarly, in the above-described modification, the "protrusions" may be constituted by portions of the pump body 156.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: drive-force transmitting apparatus
14: casing
16: drive-force transmitting mechanism
20: engine (drive force source)
38: drive wheels
50: pump shaft
50d: first step (step)
52: rotor
52c, 52d: axially opposite end surfaces
54: pump chamber
56: pump body
56a: outer peripheral portion
56d: sliding contact surface
58: pump cover
58a: outer peripheral portion
64: fluid inlet
74: fluid discharge passage
P1: first oil pump (fluid pump)
Gp: driven gear
Gd: differential ring gear (drive-force transmitting member, drive gear)
S: space

What is claimed is:

1. A drive-force transmitting apparatus for a vehicle that includes a drive force source and drive wheels, said drive-force transmitting apparatus comprising:
a drive gear that serves as a drive-force transmitting member configured to transmit a drive force from the drive force source to the drive wheels;
a fluid pump that is to driven by rotation of said drive gear; and
a casing that stores therein said drive gear and said fluid pump,
wherein said fluid pump includes:
a pump body that defines therein a pump chamber;
a pump cover that covers said pump chamber and is fixed to said pump body;
a rotor that is disposed in said pump chamber;
a driven gear that meshes with said drive gear; and
a pump shaft on which said rotor and said driven gear are mounted,
wherein said pump shaft has a supported portion and a free end portion, such that said pump shaft is rotatably supported at said supported portion by at least one of said pump body and said pump cover, and such that said driven gear is mounted on said free end portion of said pump shaft,
wherein said pump body has an outer peripheral portion that is located on an outer side of said pump body in a radial direction of said rotor, and said pump cover has an outer peripheral portion that is located on an outer side of said pump cover in said radial direction, and
wherein one of said outer peripheral portion of said pump body and said outer peripheral portion of said pump cover is supported by said casing, and the rest of said pump body and the rest of said pump cover are spaced apart from said casing.

2. The drive-force transmitting apparatus according to claim 1,
wherein said outer peripheral portion of said pump body and said outer peripheral portion of said pump cover are located on an outer side of an outer periphery of said rotor in said radial direction.

3. The drive-force transmitting apparatus according to claim 1,
wherein said pump shaft is a stepped shaft having a step, and
wherein said rotor, which is mounted on said pump shaft, has axially opposite end surfaces that are opposite to each other in an axial direction of said pump shaft, such that one of said axially opposite end surfaces of said rotor, which is closer to said free end portion of said pump shaft than the other of said axially opposite end surfaces, is in contact with said step of said pump shaft.

4. The drive-force transmitting apparatus according to claim 3,
wherein said rotor is limited, by said step of said pump shaft, from being displaced relative to said pump shaft in a first direction that is parallel to said axial direction,
wherein said driven gear is a helical gear, and
wherein, when said driven gear is driven by said drive gear during forward running of the vehicle, a thrust load is applied to said driven gear and acts in a second direction that is opposite to the first direction.

5. The drive-force transmitting apparatus according to claim 4,
wherein said pump body has a sliding contact surface which is perpendicular to said axial direction and which is in sliding contact with said other of said axially opposite end surfaces of said rotor, and
wherein at least part of said thrust load is received by said sliding contact surface of said pump body.

6. The drive-force transmitting apparatus according to claim 4,
wherein said pump body has a fluid inlet and a fluid discharge passage such that a fluid is introduced through said fluid inlet from outside said pump body and such that the fluid is discharged through said fluid discharge passage to outside said pump body, and
wherein said second direction is substantially the same as a discharge direction in which the fluid flows to be discharged through said fluid discharge passage.

7. The drive-force transmitting apparatus according to claim 6,
wherein at least a part of said fluid discharge passage is located on an inner side of an outer periphery of said rotor in said radial direction.

8. The drive-force transmitting apparatus according to claim 1, wherein said pump shaft is a cantilever shaft, and is rotatably supported by said pump body and said pump cover, wherein said rotor is fitted on an end portion of said pump shaft while said driven gear is fitted on another end portion of said pump shaft.

9. The drive-force transmitting apparatus according to claim 1, wherein said one of said outer peripheral portion of said pump body and said outer peripheral portion of said pump cover includes a plurality of connected portions that are connected to a plurality of connected portions of an inside wall surface of said casing through respective protrusions that extend between said plurality of connected portions of said one and said plurality of connected portions of said inside wall surface, and wherein the rest of said pump body and the rest of said pump cover are spaced from at least a portion of said inside wall surface of said casing which is located between said plurality of connected portions of said inside wall surface of said casing.

10. The drive-force transmitting apparatus according to claim 9, wherein said plurality of connected portions of said one of said outer peripheral portion of said pump body and said outer peripheral portion of said pump cover consist of at least three connected portions, wherein said plurality of connected portions of said inside wall surface of said casing consist of at least three connected portion, and wherein said portion of said inside wall surface of said casing, which is spaced apart from the rest of said pump body and the rest of said pump cover, is located between said at least three connected portion of said inside wall surface of said casing.

* * * * *